(12) United States Patent
Stoffel

(10) Patent No.: US 8,584,372 B2
(45) Date of Patent: Nov. 19, 2013

(54) TOOL AND EQUIPMENT ADJUSTING AND ALIGNING MEASURING GAUGE

(76) Inventor: Thomas Stoffel, Andover, MN (US)

( * ) Notice: Subject to any disclaimer, the term of this patent is extended or adjusted under 35 U.S.C. 154(b) by 263 days.

(21) Appl. No.: 13/218,136

(22) Filed: Aug. 25, 2011

(65) Prior Publication Data

US 2012/0048176 A1 Mar. 1, 2012

Related U.S. Application Data

(60) Provisional application No. 61/376,730, filed on Aug. 25, 2010.

(51) Int. Cl.
*G01B 5/02* (2006.01)
*G01B 3/22* (2006.01)
*B23Q 17/22* (2006.01)
*B27G 23/00* (2006.01)

(52) U.S. Cl.
USPC .................................. 33/628; 33/832; 33/640

(58) Field of Classification Search
USPC ........... 33/628, 832, 833, 836, 626, 633, 636, 33/640, 641, 642
See application file for complete search history.

(56) References Cited

U.S. PATENT DOCUMENTS

| | | | | |
|---|---|---|---|---|
| 3,848,339 A | * | 11/1974 | Strasbaugh | 33/507 |
| 4,196,616 A | * | 4/1980 | Argabrite et al. | 73/81 |
| 4,251,922 A | * | 2/1981 | Perlotto | 33/548 |
| 4,642,900 A | * | 2/1987 | Provost et al. | 33/606 |
| 4,894,920 A | * | 1/1990 | Butler et al. | 33/203.11 |
| 5,207,007 A | * | 5/1993 | Cucinotta et al. | 33/640 |
| 6,195,905 B1 | * | 3/2001 | Cole | 33/640 |
| 6,698,105 B2 | * | 3/2004 | Shen et al. | 33/836 |
| 7,245,199 B1 | * | 7/2007 | Reilly | 33/640 |
| 7,481,004 B2 | | 1/2009 | Krohmer et al. | |
| 7,841,102 B2 | * | 11/2010 | Xiao et al. | 33/832 |
| 7,856,733 B2 | * | 12/2010 | Hummel | 33/640 |
| D640,516 S | | 6/2011 | Krohmer et al. | |
| 7,984,563 B2 | * | 7/2011 | Van Valkenburg | 33/641 |
| 8,322,044 B2 | * | 12/2012 | Gregory et al. | 33/836 |

OTHER PUBLICATIONS

Woodpeckers Inc., New Product 2009—Woodpeckers® Saw Gauge, brochure, Jan. 2010, 1 page, Woodpeckers Inc., 11050 Industrial First Ave., North Royalton, Ohio 44133.
TS-Aligner, The Ultimate Precision Woodworking, 6 pages (Date Unknown).

(Continued)

*Primary Examiner* — Christopher Fulton
(74) *Attorney, Agent, or Firm* — Alan Kamrath; Kamrath IP Lawfirm, P.A.

(57) ABSTRACT

A measuring gauge includes an indicator having a measuring shaft for engaging with a point. A main bar includes at least one pair of a first passage and a second passage intersecting with the first passage. The first and second passages have the same size and shape of cross sections. The measuring shaft is removably received in the first passage. Threaded bores are defined in the main bar and spaced from the first and second passages. A clamp is removably received in the second passage and retains the measuring shaft. Two legs are selectively and removably engaged with the main bar. Each leg slideably abuts the main bar. A shaper spindle adapter is selectively engaged with the main bar. Two knobs are engaged with two of the threaded bores and selectively fix the legs or the shaper spindle adapter to the main bar.

16 Claims, 5 Drawing Sheets

(56) References Cited

OTHER PUBLICATIONS

Edward J. Bennett Company, TS-Aligner JR—The Affordable Precision Woodworking Tool, Product Literature©, 2005, 2 pages, Edward J. Bennett Company, 3210 E. Chinden Blvd. #115-528, Eagle, Idaho 83616.

Mastergage® Corporation, SuperBar, Instruction Manual, 4 pages, MasterGage® Corporation, P.O. Box 3072 Thousand Oaks, California 91359-0072 USA.

Trend Machinery & Cutting Tools Ltd., Gauge/1, brochure, 1 page, Trend Machinery & Cutting Tools Ltd., Odhems Trading Estate, St. Albans Road, Watford WD24 7TH England.

Rockler Companies, Inc., Router Bit Depth Gauge, ©The Woodworkers' Store 1996, brochure, Jul. 10, 1996, 1 page, Rockler Companies, Inc.

Rockler Companies, Inc., Digital Height Gauge, Webpage, Dec. 25, 2010, 2 pages, Rockler Companies, Inc.

\* cited by examiner

TOOL AND EQUIPMENT ADJUSTING AND ALIGNING MEASURING GAUGE

CROSS REFERENCE TO RELATED APPLICATION

The present application claims benefit of U.S. Application No. 61/376,730 filed Aug. 25, 2010.

BACKGROUND

A gauge, particularly a measuring gauge, is shown for adjusting and aligning tools and equipment, and more particularly, for adjusting and aligning woodworking tools.

During normal use of shapers, routers, jointers, drill presses, table saws, and the like, it is desired to check alignment of elements relative to each other such as cutters, blades, bits, fences, decks, bases, arbors, shafts, grooves, and the like. Although several alignment/adjustment gauges are on the market for some applications, conventional gauges have only limited applications and cannot perform all of the desired applications.

Thus, a need exists in the field of adjustment and alignment gauges for providing a measuring gauge which utilizes an indicator which provides instant, precise readings of vertical and horizontal positions of cutters and machine components and utilizing components providing a wide range of mounting arrangements for various applications including but not limited to gauging roundness of shafts, arbors, and the like, setting bit cutting depths, adjusting router fences, leveling extension wings or table saw throat inserts, setting heights of blades, setting fences relative to cutters or bearings, gauging whether blades of table saws are parallel to guide grooves, gauging whether spindles are perpendicular to top surfaces of shapers, and the like.

BRIEF SUMMARY

This need and other problems in the field of instant, precise readings of vertical and horizontal positions of tool and machine components as well as a wide range of mounting arrangements are solved by providing, in an aspect, a measuring gauge including an indicator having a measuring shall that is adapted to engage with a point. A main bar includes a first passage and a second passage intersecting with the first passage, with the first passage and the second passage having the same size and shape of cross sections. The measuring shaft of the indicator is removably received in the first passage. A clamp is removably received in the second passage and retains the measuring shaft of the indicator. The main bar further includes a plurality of threaded bores spaced from the first and second passages. First and second legs are selectively engaged with the main bar. Each of the first and second legs includes a plurality of holes spaced in a first direction. A front of each of the first and second legs slideably abuts the main bar. A shaper spindle adapter is selectively engaged with the main bar. An opening extends between a front and a back of the shaper spindle adapter opposite to the front. The opening of the shaper spindle adapter is adapted for securely holding a spindle of a shaper. First and second through-holes extend between the front and the back of the shaper spindle adapter and are spaced from the opening. First and second knobs are engaged with two of the plurality of threaded bores in the main bar and selectively fix the first and second legs or the shaper spindle adapter to the main bar. The measuring gauge can include only one or both of the shaper spindle adapter and the first and second legs.

When the first and second legs engage with the main bar, the first and second knobs extend through one of the plurality of holes of the first and second legs into two of the plurality of threaded bores of the main bar, and the first leg is spaced from the second leg in a second direction perpendicular to the first direction.

When the shaper spindle adapter engages with the main bar and with the first and second legs removed from the main bar, the first and second knobs extend through the first and second through-holes of the shaper spindle adapter into two of the plurality of threaded bores of the main bar to fix the shaper spindle adapter to the main bar.

In the form shown, the clamp includes a plug having an outer periphery slideably received in the shape of cross sections of the second passage. The clamp further includes a bolt having a shaft threadable in a threaded through-hole of the plug. Rotation of an enlarged head of the bolt moves the plug in the second passage to frictionally engage a recess in the outer periphery of the plug with the measuring shaft to retain the indicator relative to the main bar.

In the form shown, the main bar includes opposite first and second surfaces and opposite first and second sides extending perpendicularly to and between the first and second surfaces. The main bar further includes a first bevel extending between the first side and the first surface and a second bevel extending between the first side and the second surface. The main bar includes a plurality of pairs of the first and second passages. The first passages of the plurality of pairs of the first and second passages extend between the first and second surfaces. The second passages of the plurality of pairs of the first and second passages extend between the first and second sides. The front of each of the first and second legs includes a plurality of indentations spaced in the first direction. Each of the plurality of indentations of each of the first and second legs includes first and second sidewalls slideably abutting the first and second bevels of the main bar. Each of the plurality of indentations of each of the first and second legs further includes a bottom wall extending between the first and second sidewalls and slideably abutting the first side of the main bar. Each of the plurality of holes of each of the first and second legs extends through the bottom wall of one of the plurality of indentations. Centers of the plurality of holes of each of the first and second legs are spaced from each other at a regular interval.

Illustrative embodiments will become clearer in light of the following detailed description described in connection with the drawings.

DESCRIPTION OF THE DRAWINGS

The illustrative embodiments may best be described by reference to the accompanying drawings where.

Figure 1:
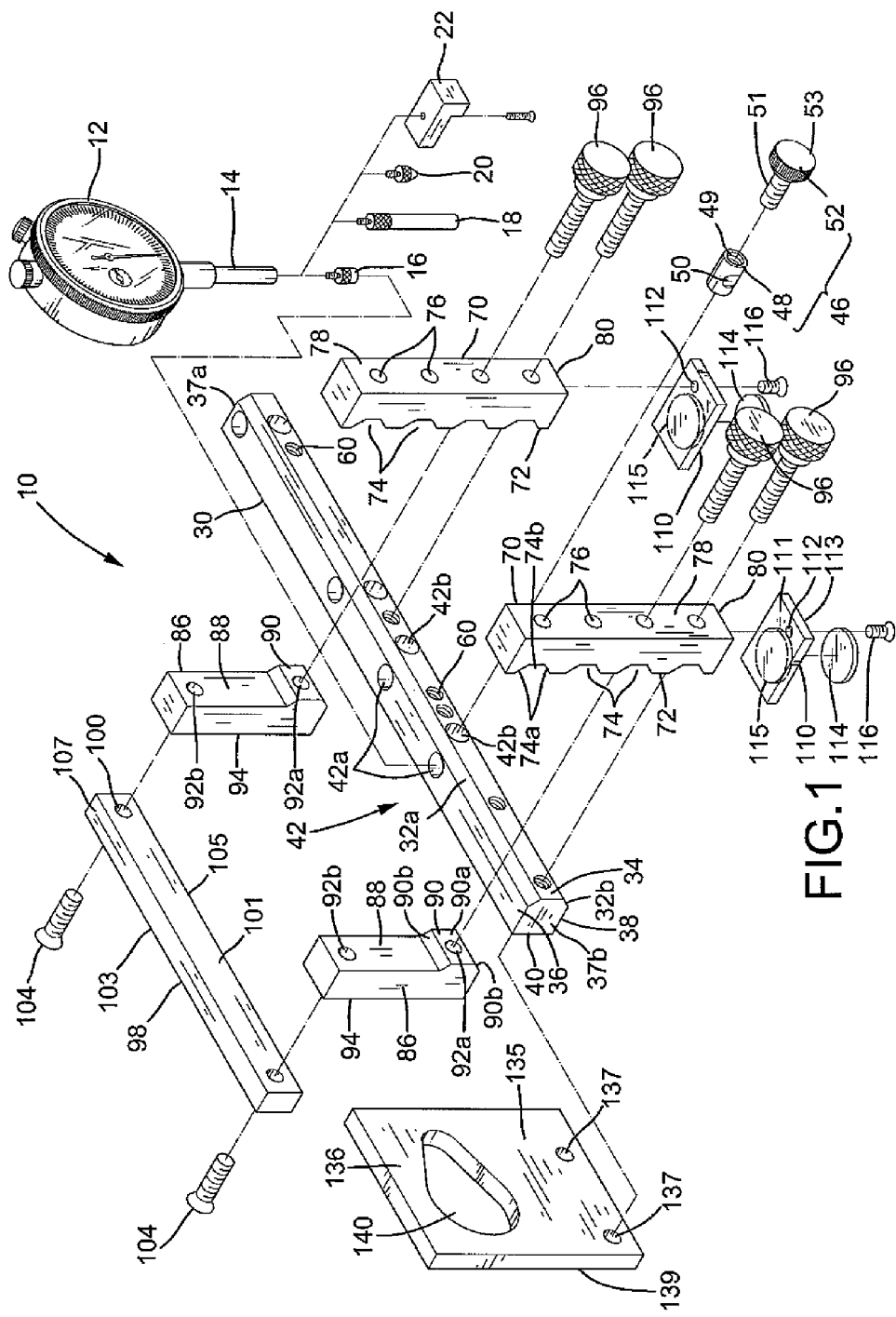
FIG. 1 shows an exploded, perspective view of a measuring gauge.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

Where used in the various figures of the drawings, the same numerals designate the same or similar parts. Furthermore, when the terms "top", "bottom", "first", "second", "third", "fourth", "fifth", "sixth", "front", "back", "height", "width", "length", "end", "side", "horizontal", "vertical", and similar terms are used herein, it should be understood that these terms have reference only to the structure shown in the drawings as it would appear to a person viewing the drawings and are utilized only to facilitate describing the illustrative embodiments.

DETAILED DESCRIPTION

A measuring gauge utilized for adjusting and aligning tools and equipment, such as woodworking tools, is generally shown in the drawings and generally designated 10. In particular, measuring gauge 10 utilizes an indicator 12 to provide instant readings of vertical and horizontal positions of cutters and machine components. In the form shown, indicator 12 is a conventional dial indicator such as purchased from Phase II Plus of Carlstadt N.J. 07072. However, indicator 12 can be of other forms and types.

In the form shown, indicator 12 includes a measuring shaft 14 including a counterbore. It can be appreciated that various contact points can be added including a short cylindrical contact point 16, a long cylindrical point 18, a bullet shaped point 20, and an L-shaped, edge guide point 22, with short cylindrical contact point 16, long cylindrical 18 and bullet shaped point 20 shown as including an integral stud for threadable receipt in the counterbore of measuring shaft 14, while edge guide point 22 includes a screw for threadable receipt in the counterbore of measuring shaft 14.

Measuring gauge 10 generally includes a main bar 30 having generally rectangular cross sections. In the form shown, main bar 30 includes a first surface 36 and a second surface 38 opposite and parallel to first surface 36. Main bar 30 further includes a first side 34 and a second side 40 opposite and parallel to first side 34. First and second sides 34 and 40 extend perpendicularly to and between first and second surfaces 36 and 38. Main bar 30 further includes first and second end faces 37a and 37b extending between first and second surfaces 36 and 38 and between first and second sides 34 and 40. A first bevel 32a extends between and at an obtuse angle to first side 34 and first surface 36. A second bevel 32b extends between and at an obtuse angle to first side 34 and second surface 38.

A plurality of indicator mounting provisions 42 are provided in main bar 30. In the form shown, each indicator mounting provision 42 includes intersecting, generally perpendicular passages including a first passage 42a extending between first and second surfaces 36 and 38 and a second passage 42b extending between first and second sides 34 and 40. First and second passages 42a and 42b have the same size and shape of cross sections which are circular in the form shown. In the form shown, main bar 30 includes four pairs of first and second passages 42a and 42b. One of first passages 42a is located in an end of main bar 30 adjacent to first end face 37a of main bar 30. The other three first passages 42a are located in an intermediate section of main bar 30 and spaced from first passage 42a in the end of main bar 30 by at least one fourth of the length between first and second end faces 37a and 37b. The first and second passages 42a and 42b are spaced from second end face 37b of main bar 30 by at least one fourth of the length between first and second end faces 37a and 37b. It can be appreciated that first passages 42a can extend between first and second sides 34 and 40, whereas second passages 42b can extend between first and second surfaces 36 and 38.

Each indicator mounting provision 42 further includes a clamp 46 for clamping measuring shaft 14 for indicator 12 in one of first and second passages 42a and 42b as desired. In the form shown, clamp 46 includes a plug 48 having a threaded through-hole 49 and having cross sections corresponding to and for slideable receipt in either passage 42a or 42b. Plug 48 includes a recess 50 formed in its outer periphery of a cross section compatible with measuring shaft 14. Namely, the outer periphery of plug 48 is slideably received in the shape of cross sections of either passage 42a or 42b. Clamp 46 further includes a bolt 52 having a shaft 51 threadable in threaded through-hole 49 of plug 48 and an enlarged head 53 (which could include a compressible washer) for manual rotation without tools. To clamp indicator 12 to main bar 30, plug 48 is placed in one of passages 42a and 42b with recess 50 aligned with the other passage 42a or 42b. Measuring shaft 14 can be inserted in the other passage 42a or 42b and recess 50, with a portion of measuring shaft 14 received in passage 42a or 42b having the same size and shape of cross sections as passage 42a and 42b. Shaft 51 of bolt 52 can be threaded into threaded through-hole 49 of plug 48 until enlarged head 53 abuts with main bar 30. Thus, plug 48 is pulled within passage 42a or 42b to frictionally engage recess 50 with measuring shaft 14 to retain indicator 12 relative to main bar 30.

According to the form shown, main bar 30 further includes a plurality of threaded bores 60 extending between first and second sides 34 and 40 and spaced from first and second passages 42a and 42b. In the form shown, main bar 30 includes first, second, third, fourth, fifth, and sixth threaded bores 60 arranged from first end face 37a to second end face 37b. First threaded bore 60 is located between the first two of second passages 42b adjacent to first end face 37a. Second threaded bore 60 is located between the second and third ones of second passages 42b. Third and fourth threaded bores 60 are located between the third and last ones of second passages 42b. Fifth and sixth threaded bores 60 are located between the last second passage 42b and second end face 37b.

According to the form shown, measuring gauge 10 includes a plurality of legs 70 of a generally rectangular cross section. Each leg 70 includes a front 72 and a back 78 opposite to front 72. Front 72 of each leg 70 includes a plurality of spaced indentations 74 of a shape corresponding to and for slideably receiving first and second bevels 32a and 32b and first side 34 of main bar 30. Each indentation 74 includes a hole 76 extending from front 72 to back 78. Specifically, each indentation 74 of each leg 70 includes first and second sidewalls 74a slideably abutting first and second bevels 32a and 32b of main bar 30. Each indentation 74 of each leg 70 further includes a bottom wall 74b extending between first and second sidewalls 74a and slideably abutting first side 34 of main bar 30. Each hole 76 of each leg 70 extends through bottom wall 74b of one indentation 74. The centers of holes 76 of each leg 70 are spaced from each other at a regular interval and are spaced by one inch in the form shown. Each leg 70 further includes an end 80 extending perpendicular to and between front 72 and back 78. End 80 of each leg 70 includes a tapped hole. A tapped hole is also provided in front 72 intermediate end 80 and a first one of indentations 74 adjacent to end 80.

According to the form shown, measuring gauge 10 further includes a plurality of miter slot bar extensions 86 having generally rectangular cross sections. Each miter slot bar extension 86 includes a front 88 and a back 94 opposite to front 88. Front 88 of each miter slot bar extension 86 includes a projection 90 of a shape corresponding to indentation 74 and to first and second bevels 32a and 32b and first side 34 of main bar 30. Specifically, projection 90 includes a flat face 90a parallel to and spaced from front 88 and first and second inclined faces 90b extending between front 88 and flat face 90a, with flat face 90a extending between first and second inclined faces 90b. First and second threaded tunnels 92a and 92b extend between front 88 and back 94, with first threaded tunnel 92a extending through projection 90. Projection 90 can be received in one of the indentations 74 of a leg 70 and secured thereto such as by a knob 96 extending through one of holes 76 and threadably received in first threaded tunnel 92a. Specifically, flat face 90a of projection 90 abuts bottom wall 74b of indentation 74, and first and second inclined faces 90b abut first and second sidewalls 74a of indentation 74.

According to the form shown, measuring gauge 10 further includes a miter slot bar 98 of generally rectangular cross sections. Miter slot bar 98 includes a front 101 and a back 103 opposite to front 101. Miter slot bar 98 further includes first and second through-holes 100 extending between front 101 and back 103. Each of first and second through-holes 100 has a conical counterbore extending from back 103. Miter slot bar 98 also includes a socket extending from a first face 105 extending between front 101 and back 103, with the socket being spaced from a second face 107 opposite to first face 105. The socket receives a spring biased detent that can push miter slot bar 98 securely against a side of a miter gauge slot machined into a machinery table to eliminate lateral movement, providing accurate and consistent measurement readings. Thus, front 101 of miter slot bar 98 can abut with backs 94 of miter slot bar extensions 86 and is attached thereto by screws 104 extended through first and second through-holes 100 and threadably received in second threaded tunnels 92b.

According to the form shown, measuring gauge 10 further includes a support foot 110 for each leg 70 of generally rectangular cross sections. Each support foot 110 includes a top 111 and a bottom 113 opposite to top 111. A through-hole 112 extends between top 111 and bottom 113 of each support foot 110 and includes a conical counterbore extending from bottom 113. A cylindrical recess 115 is formed in bottom 113 of each support foot 110 and spaced from through-hole 112. A magnet 114 is securely received in recess 115 of each support foot 110. Magnet 114 can be a rare earth magnet. Top 111 of each support foot 110 can abut with end 80 of leg 70, with support foot 110 attached to leg 70 such as by a screw 116 extending through-hole 112 and threaded into the tapped hole formed in end 80.

According to the form shown, measuring gauge 10 further includes a shaper spindle adapter 136 having a front 135 and a back 139 opposite to front 135. An opening 140 in the form shown having a shape such as a tear drop extends between front 135 and back 139. Shaper spindle adapter 136 further includes a plurality of through-holes 137 extending between front 135 and back 139 and spaced from opening 140.

Figure 2:
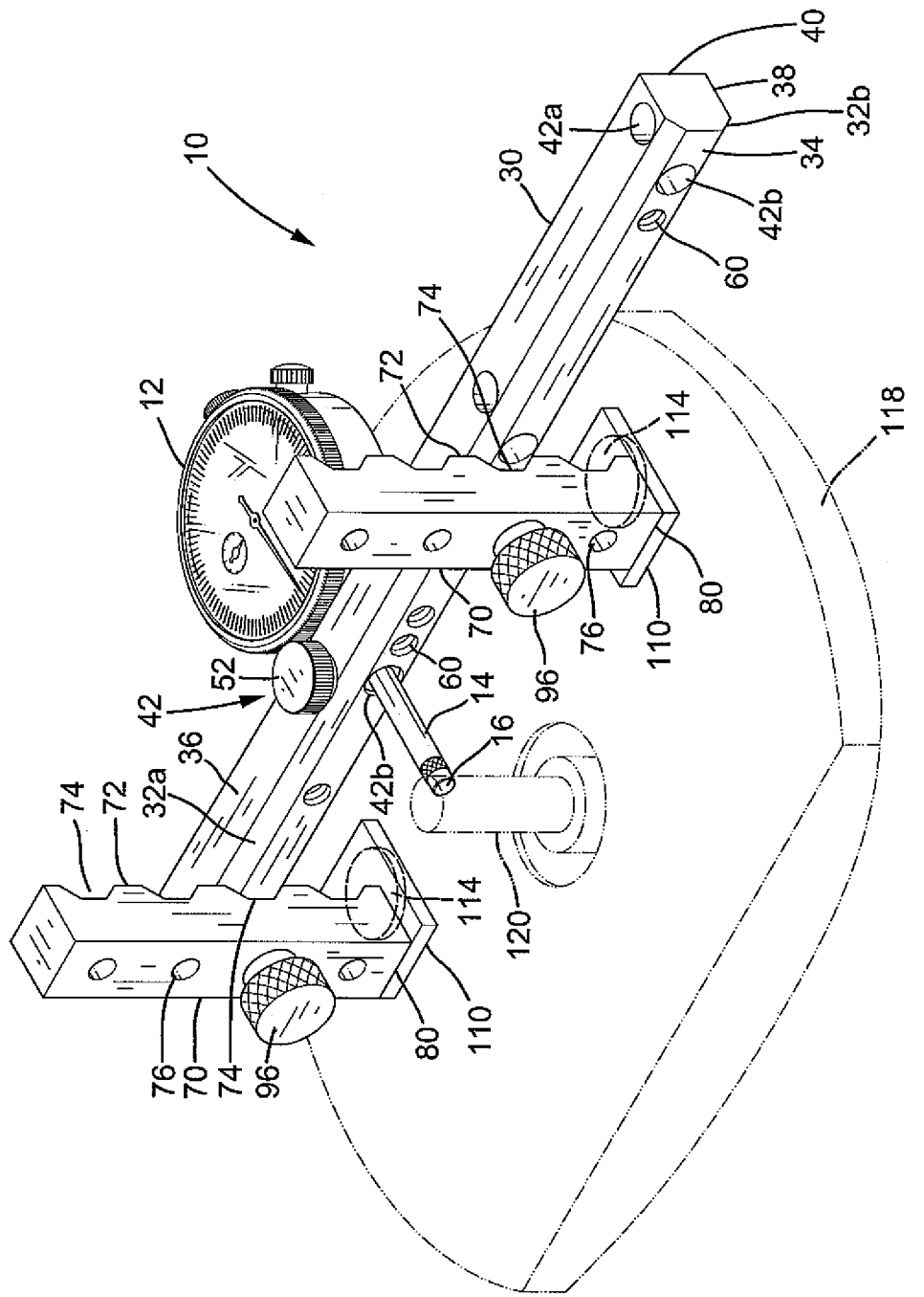
FIGS. 2-5 show perspective views of the measuring gauge of FIG. 1 in different applications of measurement, alignment, and setting.

According to the form shown, the elements of measuring gauge 10 can be suitably arranged such that indicator 12 is supported intermediate legs 70 or in a cantilevered manner to measure vertical and/or horizontal distances for purposes of adjusting and aligning tools and equipment. For purposes of explanation and not limitation, various arrangements of the elements of measuring gauge 10 will be shown and described. As an example, FIG. 2 shows support feet 110 resting upon a base 118 of a router or a router table having a rotating shaft 120. Short cylindrical contact point 16 on measuring shaft 14 of indicator 12 located intermediate legs 70 attached to first side 34 engages rotating shaft 120 to gauge roundness of rotating shaft 120. Legs 70 are spaced from each other in a direction perpendicular to the direction in which holes 76 of legs 70 are spaced from each other. In a similar manner, if indicator 12 is arranged to be parallel to legs 70 (rather than perpendicular as shown in FIG. 2), measuring gauge 10 could be utilized to set the bit cutting depth such as utilizing short cylindrical contact point 16 or edge guide point 22, to adjust a router fence utilizing edge guide point 22, or the like. Further, if indicator 12 is rotated 180° relative to main bar 30, measuring gauge 10 could be utilized for fine fence adjustment including but not limited to be flush with a guide bearing of a router bit. Furthermore, rotating shaft 120 can be of a size for slideable receipt in first or second passages 42a or 42b and held therein such as by a knob threadably received in a threaded axial bore formed in rotating shaft 120. Thus, rotating shaft 120 is utilized as a router/drill press adopter so that measuring gauge 10 can be utilized for alignment/adjustment thereof.

Figure 3:
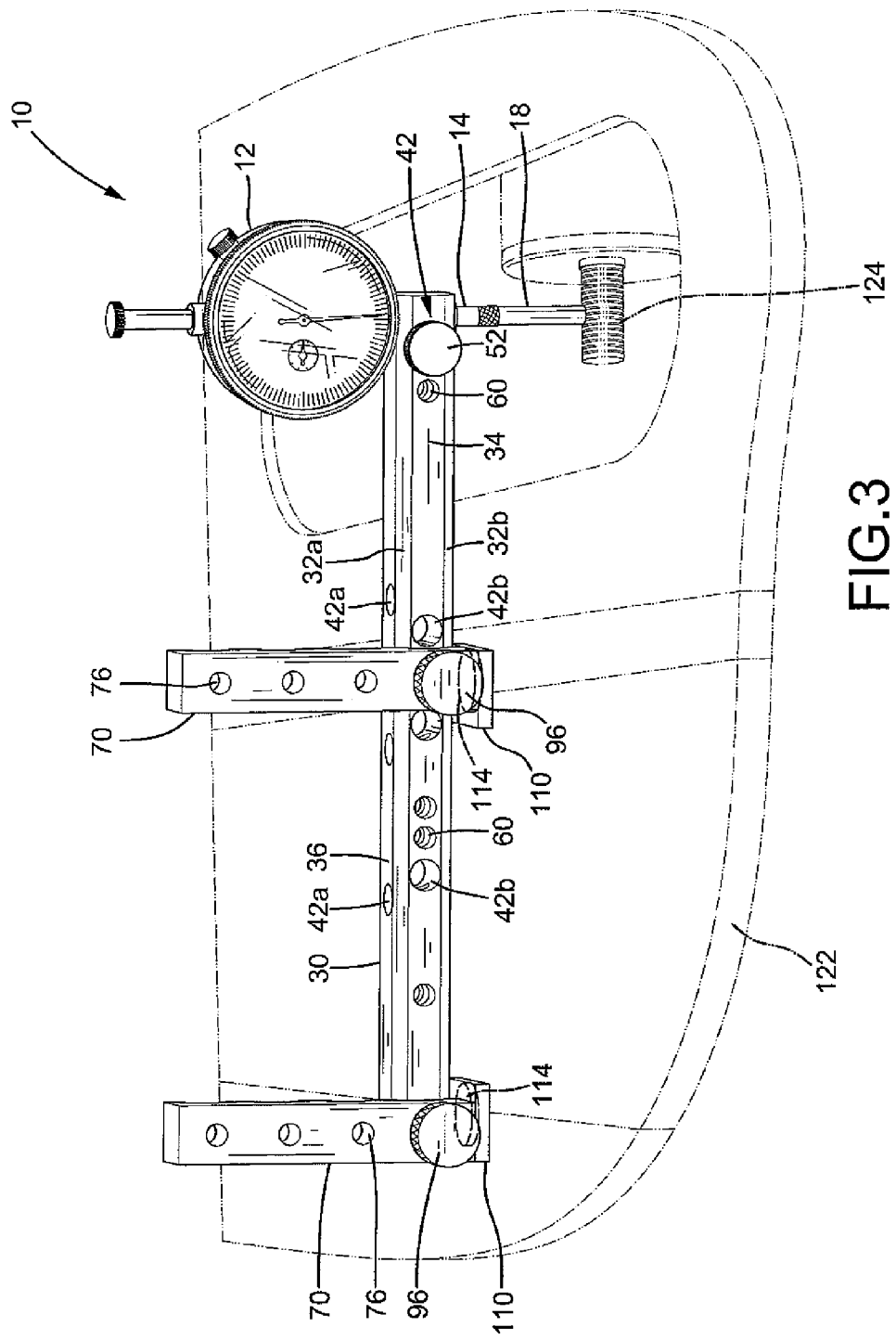

In another example, indicator 12 can be attached to the end of main bar 30 supported generally parallel to a deck 122 of a table saw having an arbor 124 by support feet 110 resting upon deck 122 and attached to legs 70 attached to first side 34, as shown in FIG. 3. Long cylindrical point 18 on measuring shaft 14 of indicator 12 engages arbor 124 to gauge roundness of arbor 124. Likewise, measuring gauge 10 in the arrangement of FIG. 3 could be utilized to level an extension wing or a table saw throat insert, to set height of a blade 128 of the table saw, to set a fence relative to the cutter or bearings thereof, whether the fence is straight or offset, or the like.

Figure 4:
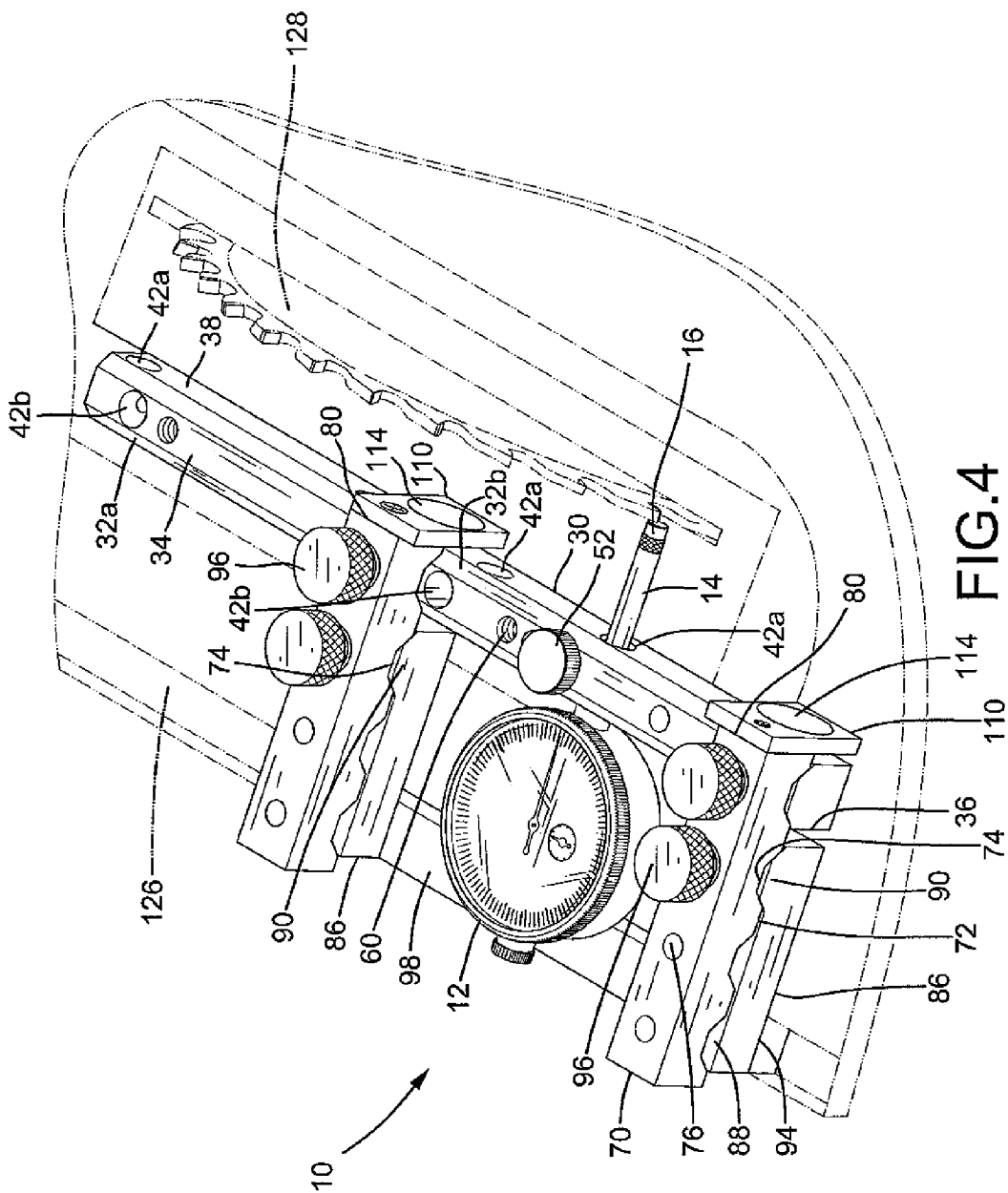

FIG. 4 shows miter slot bar 98 located in a guide groove 126 of deck 122 secured to backs 94 of miter slot bar extensions 86 secured to fronts 72 of legs 70 secured to first side 34 of main bar 30. Short cylindrical contact point 16 on measuring shaft 14 of indicator 12 located intermediate legs 70 engages with blade 128 secured to arbor 124 of the table saw to gauge if blade 128 is parallel to guide groove 126. Likewise, measuring gauge 10 in the arrangement of FIG. 4 could be used to align a fence with guide groove 126.

Figure 5:
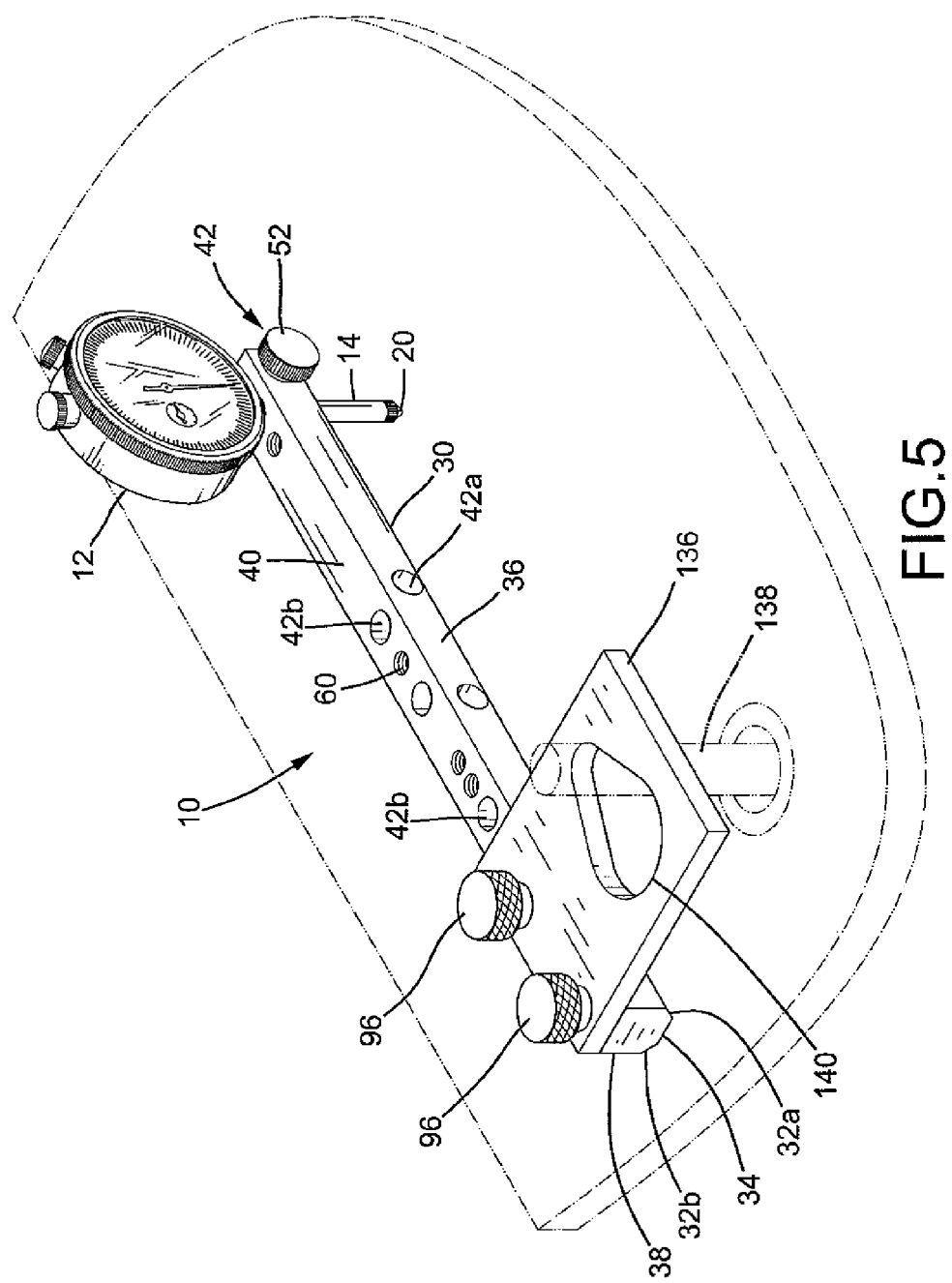

In a further example, shaper spindle adapter 136 can be attached to main bar 30 by knobs 96 extending through through-holes 137 and threaded into threaded bores 60 of main bar 30. A spindle 138 of a shaper can be extended through and suitably secured to opening 140 such as in a manner shown in FIG. 5 or can be attached directly to main bar 30 by knob 96 extending through first passage 42a. Main bar 30 can be rotated so that bullet shaped point 20 moves on the top surface of the shaper to gauge if spindle 138 is perpendicular to the top surface.

Now that the basic teachings have been explained, many extensions and variations will be obvious to one having ordinary skill in the art. For example, the number of legs 70, support feet 110, miter slot bar extensions 86, and miter slot bar 98 can be varied according to needs. Likewise, the number and location of first and second passages 42a and 42b and threaded bores 60 in main bar 30, of indentations 74 and holes 76 in each leg 70, and of magnet 114 of each support foot 110 can be varied according to needs.

Measuring gauge 10 provides a modular design allowing use for vertical or horizontal measurements. Four holes 76 with centers spaced by one inch in each leg 70 provide four height mounting positions along legs 70 to allow accurate height measurements up to 3 inches and depth readings up to 2 inches. Threaded bores 60 provide a plurality of leg mounting positions along the length of main bar 30 so that main bar 30 can adapt to different sizes and shapes of the reference face. Since first and second sidewalls 74a and bottom wall 74b of each leg 70 slideably abut first and second bevels 32a and 32b and first side 34 of main bar 30, legs 70 can smoothly and rapidly slide along the length of main bar 30 to desired locations of threaded bores 60. First and second inclined faces 90*b* and flat face 90*a* of projection 90 of each miter slot bar extension 86 slideably abut first and second sidewalls 74*a* and bottom wall 74*b* of indentation 74 of either leg 70, allowing fast, secure engagement of miter slot bar extension 86 to leg 70.

Furthermore, multiple pairs of first and second passages 42*a* and 42*b* provide multiple indicator locations along main bar 30, enabling indicator 12 to either span over a measurement point or cantilever from one side. Clamp 46 allows indicator 12 to be rotated 360° and mounted vertically, horizontally, or even inverted. Further, legs 70 can be located firmly on a magnetic surface by attachment of support feet 110 with magnets 114. The socket of miter slot bar 98 receives a spring biased detent that can push miter slot bar 98 securely against a side of a miter gauge slot machined into a machinery table to eliminate lateral movement, providing accurate and consistent measurement readings. The elements of measuring gauge 10 can be changed without tools for quick and easy use on various tools for adjustment, measurement, alignment, setting of depth of tool elements. All elements of measuring gauge 10 can be stored in a small storage case to allow easy carriage and storage.

Although the embodiments shown provide a very wide range of mounting arrangements, novel features of the illustrative embodiments could be utilized while omitting some and/or could be utilized with the other features in other arrangements than shown for a different/narrower range of mounting arrangements.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. A measuring gauge comprising, in combination:
    an indicator including a measuring shaft, with the measuring shaft adapted to engage with a point;
    a main bar including at least one pair of a first passage and a second passage intersecting with the first passage, with the first passage and the second passage having a same size and shape of cross sections, with the measuring shaft of the indicator removably received in the first passage, with the main bar further including a plurality of threaded bores spaced from the first and second passages;
    a clamp removably received in the second passage and retaining the measuring shaft of the indicator;
    first and second legs selectively engaging with the main bar, with each of the first and second legs including a front and a back opposite to the front, with each of the first and second legs further including a plurality of holes spaced in a first direction, with the front of each of the first and second legs slideably abutting the main bar; and
    first and second knobs selectively fixing the first and second legs to the main bar,
    wherein with the first and second legs engaging with the main bar, the first and second knobs extend through one of the plurality of holes of the first and second legs into two of the plurality of threaded bores of the main bar, with the first leg spaced from the second leg in a second direction perpendicular to the first direction.

2. The measuring gauge as claimed in claim 1, further comprising, in combination:
    a shaper spindle adapter selectively engaging with the main bar, with the shaper spindle adapter including a front and a back opposite to the front of the shaper spindle adapter, with an opening extending between the front and the back of the shaper spindle adapter, with first and second through-holes extending between the front and the back of the shaper spindle adapter and spaced from the opening, with the opening of the shaper spindle adapter adapted for securely holding a spindle of a shaper,
    wherein with the shaper spindle adapter engaging with the main bar and with the first and second legs removed from the main bar, the first and second knobs extend through the first and second through-holes of the shaper spindle adapter into two of the plurality of threaded bores of the main bar to fix the shaper spindle adapter to the main bar.

3. The measuring gauge as claimed in claim 1, with the clamp including a plug having a threaded through-hole, with the plug including an outer periphery having a recess, with the outer periphery of the plug slideably received in the shape of cross sections of the second passage, with the clamp further including a bolt having a shaft threadable in the threaded through-hole of the plug, with the bolt further having an enlarged head, with rotation of the enlarged head moving the plug in the second passage to frictionally engage the recess of the plug with the measuring shaft to retain the indicator relative to the main bar.

4. The measuring gauge as claimed in claim 1, with the main bar including a first surface and a second surface opposite to the first surface, with the main bar further including a first side and a second side opposite to the first side, with the first and second sides extending perpendicularly to and between the first and second surfaces, with the first passage extending between one of the first and second surfaces and of the first and second sides, with the second passage extending between the other of the first and second surfaces and of the first and second sides, with the plurality of threaded bores of the main bar extending between the first and second sides, with the front of each of the first and second legs slideably abutting the first side of the main bar when the first and second knobs fix the first and second legs to the first side of the main bar.

5. The measuring gauge as claimed in claim 4, with the main bar further including a first bevel extending between the first side and the first surface, with the main bar further including a second bevel extending between the first side and the second surface, with the front of each of the first and second legs including a plurality of indentations spaced in the first direction, with each of the plurality of indentations of each of the first and second legs including first and second sidewalls slideably abutting the first and second bevels of the main bar, with each of the plurality of indentations of each of the first and second legs further including a bottom wall extending between the first and second sidewalls and slideably abutting the first side of the main bar.

6. The measuring gauge as claimed in claim 5, with each of the plurality of holes of each of the first and second legs extending through the bottom wall of one of the plurality of indentations, with centers of the plurality of holes of each of the first and second legs spaced from each other at a regular interval.

7. The measuring gauge as claimed in claim 5, with the at least one pair of the first and second passages including a plurality of pairs of the first and second passages, with the first passages of the plurality of pairs of the first and second passages extending between the first and second surfaces, with the second passages of the plurality of pairs of the first and second passages extending between the first and second sides.

8. The measuring gauge as claimed in claim 7, with the main bar including first and second end faces extending between the first and second surfaces and between the first and second sides, with the first and second end faces having a length therebetween, with the first passage of one of the plurality of pairs of the first and second passages located in an end of the main bar adjacent to the first end face, with the first passages of the remaining of the plurality of pairs of the first and second passages located in an intermediate section of the main bar and spaced from the first passage of the one of the plurality of pairs of the first and second passages in the end by at least one fourth of the length.

9. The measuring gauge as claimed in claim 7, further comprising, in combination:
first and second miter slot bar extensions each having a front and a back opposite to the front, with the front of each of the first and second miter slot bar extensions including a projection of a shape corresponding to each of the plurality of indentations of the first and second legs and to the first and second bevels and the first side of the main bar, with each of the first and second miter slot bar extensions including a threaded tunnel extending between the front and the back thereof, with one of the plurality of indentations of each of the first and second legs engaged with the first side of the main bar, with the projection of the first miter slot bar received in another of the plurality of indentations of the first leg with a third knob extending through the other of the plurality of indentations of the first leg and threadably received in the threaded tunnel of the first miter slot bar extension, with the projection of the second miter slot bar received in another of the plurality of indentations of the second leg with a fourth knob extending through the other of the plurality of indentations of the second leg and threadably received in the threaded tunnel of the second miter slot bar extension; and
a miter slot bar removably mounted to the backs of the first and second miter slot bar extensions.

10. The measuring gauge as claimed in claim 9, with the projection of each of the first and second miter slot bar extensions including a flat face parallel to and spaced from the front thereof, with the projection of each of the first and second miter slot bar extensions further including first and second inclined faces extending between the front and the flat face, with the flat face extending between the first and second inclined faces, with the flat face of the first miter slot bar extension abutting the bottom wall of the other of the plurality of indentations of the first leg, with the first and second inclined faces of the first miter slot bar extension abutting the first and second sidewalls of the other of the plurality of indentations of the first leg, with the flat face of the second miter slot bar extension abutting the bottom wall of the other of the plurality of indentations of the second leg, with the first and second inclined faces of the second miter slot bar extension abutting the first and second sidewalls of the other of the plurality of indentations of the second leg.

11. The measuring gauge as claimed in claim 7, further comprising, in combination:
a support foot removably mounted to each of the first and second legs, with each of the first and second legs including an end extending perpendicular to and between the front and the back thereof, with each of the support feet including a top and a bottom opposite to the top, with the tops of the support feet abutting with the ends of the first and second legs, with a recess formed in the bottom of each of the support feet, with a magnet securely received in the recess of each of the support feet, with the magnet adapted to locate firmly on a magnetic surface.

12. A measuring gauge comprising, in combination:
an indicator including a measuring shaft, with the measuring shaft adapted to engage with a point;
a main bar including at least one pair of a first passage and a second passage intersecting with the first passage, with the first passage and the second passage having a same size and shape of cross sections, with the measuring shaft of the indicator removably received in the first passage, with the main bar further including a plurality of threaded bores spaced from the first and second passages;
a clamp removably received in the second passage and retaining the measuring shaft of the indicator;
a shaper spindle adapter removably engaged with the main bar, with the shaper spindle adapter including a front and a back opposite to the front of the shaper spindle adapter, with an opening extending between the front and the back of the shaper spindle adapter, with first and second through-holes extending between the front and the back of the shaper spindle adapter and spaced from the opening, with the opening of the shaper spindle adapter adapted for securely holding a spindle of a shaper; and
first and second knobs releasably fixing the shaper spindle adapter to the main bar,
wherein with the shaper spindle adapter engaging with the main bar, the first and second knobs extend through the first and second through-holes into two of the plurality of threaded bores of the main bar to fix the shaper spindle adapter to the main bar.

13. The measuring gauge as claimed in claim 12, with the clamp including a plug having a threaded through-hole, with the plug including an outer periphery having a recess, with the outer periphery of the plug slideably received in the shape of cross sections of the second passage, with the clamp further including a bolt having a shaft threadable in the threaded through-hole of the plug, with the bolt further having an enlarged head, with rotation of the enlarged head moving the plug in the second passage to frictionally engage the recess of the plug with the measuring shaft to retain the indicator relative to the main bar.

14. The measuring gauge as claimed in claim 12, with the main bar including a first surface and a second surface opposite to the first surface, with the main bar further including a first side and a second side opposite to the first side, with the first and second sides extending perpendicularly to and between the first and second surfaces, with the first passage extending between one of the first and second surfaces and of the first and second sides, with the second passage extending between the other of the first and second surfaces and of the first and second sides, with the plurality of threaded bores of the main bar extending between the first and second sides.

15. The measuring gauge as claimed in claim 14, with the at least one pair of the first and second passages including a plurality of pairs of the first and second passages, with the first passages of the plurality of pairs of the first and second passages extending between the first and second surfaces, with the second passages of the plurality of pairs of the first and second passages extending between the first and second sides.

16. The measuring gauge as claimed in claim 15, with the main bar including first and second end faces extending between the first and second surfaces and between the first and second sides, with the first and second end faces having a length therebetween, with the first passage of one of the plurality of pairs of the first and second passages located in an end of the main bar adjacent to the first end face, with the first passages of the remaining of the plurality of pairs of the first and second passages located in an intermediate section of the main bar and spaced from the first passage of the one of the plurality of pairs of the first and second passages in the end by at least one fourth of the length.

\* \* \* \* \*